Patented Jan. 2, 1923.

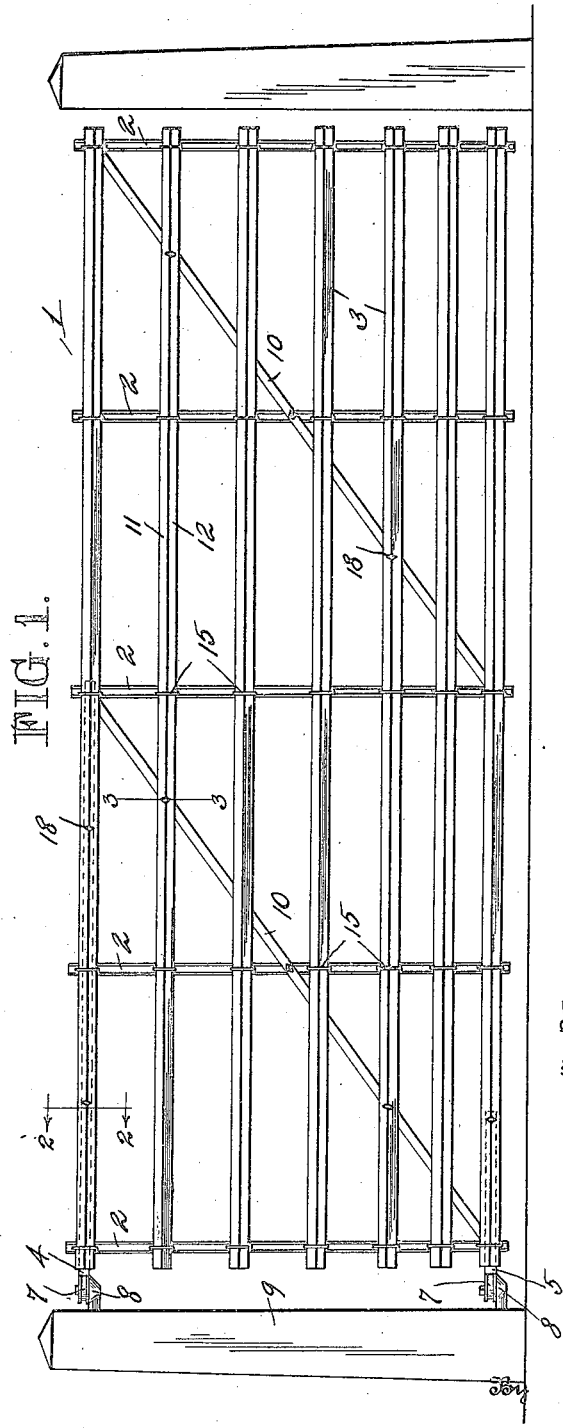
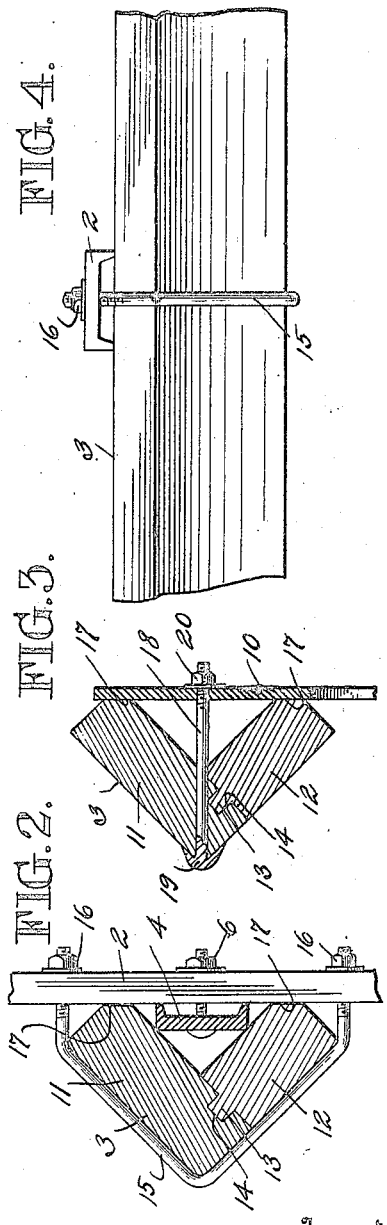

1,440,445

UNITED STATES PATENT OFFICE.

CHARLEY BURNETT, OF WASHINGTON COURT HOUSE, OHIO.

FARM GATE.

Application filed December 17, 1921. Serial No. 523,002.

*To all whom it may concern:*

Be it known that CHARLEY BURNETT, a citizen of the United States, residing at Washington Court House, in the county of Fayette and State of Ohio, has invented certain new and useful Improvements in Farm Gates, of which the following is a specification.

This invention relates to improvements in farm gates, and has for its object the provision of an improved gate containing a novel arrangement or a correlation of parts which serve for the purpose of rendering the gate light in weight, easy to operate and economical to produce and, more particularly, of exceptionally substantial and durable construction.

Another object of the invention resides in the formation of a gate providing a plurality of longitudinally extending bar members, each of said bar members consisting of a pair of longitudinally extending sections, arranged substantially at right angles to one another and cooperatively connected with the frame of the gate so that the completed structure will possess a maximum degree of rigidity and yet will be capable of flexing when subjected to laterally directed twisting stresses.

For a further understanding of the invention, reference is to be had to the following description and to the accompanying drawing, in which similar characters of reference denote like and corresponding parts throughout the several views thereof.

In said drawing:

Figure 1 is a side elevation of the improved gate comprising the present invention, Figure 2 is a vertical transverse sectional view taken through the gate on the plane indicated by the line 2—2 of Figure 1, Figure 3 is a similar view on the line 3—3 of Figure 1, and Figure 4 is a detail plan view.

Referring more particularly to the details of the invention, the numeral 1 designates my improved gate in its entirety. In its preferred embodiment, which is the form shown in the drawing, the said gate is constructed to include a plurality of spaced vertically disposed channel bars 2, preferably of metallic construction, and disposed so that their spaced edge flanges will engage with the inner edges of a plurality of vertically spaced horizontally or longitudinally extending bar members 3, which are adapted to be rigidly secured to the bars 2 for the purpose of producing a substantially rigid construction and the gate may be pivotally hung by providing a longitudinally extending metallic bar 4 at the upper edge of the gate and a similar but shorter bar 5 at the lower portion thereof, the said bars 4 and 5 being rigidly connected as at 6 with the vertically disposed channel bars 2 or by frictional engagement with the bar members 3. The said bars 4 and 5 have their ends provided with suitable eyes 7, arranged to be received about rigidly held vertical pintles 8 formed with a post member 9, the said gate being thereby capable of swinging horizontally in the usual manner common to gates of this character. Also, to reinforce and render the gate structure rigid, I provide a plurality of diagonally extending metallic braces 10, suitably connected with the channel bars 2, so as to produce a strong metallic tie between the bars 2.

The present invention resides primarily in the construction of the longitudinally extending bar members 3. These members are arranged in pairs or sections, each pair of sections constituting a single complete bar member. These sections which are designated by the numerals 11 and 12, are formed from wood, which has been found to be the only material suitable in carrying out the ends of the invention. The said sections are set at right angles with respect to each other, the lower section 12 being provided with a longitudinally extending tongue 13, arranged to be received within a groove 14 suitably mortised in the upper section 11, this joint construction serving to effect a strong and substantial union between the sections of each bar member. A grain of the wooden sections 11 and 12 runs lengthwise thereof for the purpose of enabling the sections to withstand twisting and bending stresses to which the gate as a whole is subject. To secure the said sections rigidly to the bars 2, I preferably employ triangular bolts 15, which have their threaded ends passed through openings provided in the bars 2 and equipped with nuts or other threaded binding devices 16, which when tightened will serve to draw the sections into firm frictional relationship with the vertical edges of the bars 2 and to thereby restrain the said bar members from vertical movement with respect to the panel bars. It will of course be appreciated that by reason of the loop construction of the bolts 15 the said bar members will be retained in their applied positions even though the nuts 16 should become accidentally loosened. Since the bar members extend angularly with respect to the bars 2, the inner edges thereof may be planed as at 17 to produce an extended bearing surface between the sections and the bars 2 for the purpose of increasing the effectiveness of the fastening elements 15 and 16. The diagonally extending braces 10 are connected directly with the bar members 4 by means of bolts 18, which are formed with heads 19 capable of conforming with the angular formation of the exterior surfaces of said bar members. The inner ends of the bolts 18 pass through the metallic braces 10 and are provided with nuts 20 capable of drawing the braces and the bar members into united relation.

In view of the foregoing description it will be seen that the present invention provides a farm gate wherein the longitudinal bar members thereof are of peculiar construction for the purpose of providing a farm gate which will be generally more substantial and to possess a longer life than farm gates of ordinary construction, wherein the horizontally extending bars are located on the same plane as the vertically extending channel bars. The angular formation of the wooden sections of the bar or rail members 3 produces a gate which will be inflexible when straight vertically directed stresses are applied thereto. Thus, heavy weights may be positioned on the outer or free swinging end of the gate without causing the latter to sag or to scrape along the ground. However, if laterally directed twisting stresses are applied to the gate there would be sufficient flexibility found in the latter to permit of limited movement. This feature is desirable in enabling the gate to withstand shocks and jolts which are imparted thereto when in actual service.

What is claimed is:

1. In a farm gate, a plurality of vertically disposed longitudinally spaced rails, a plurality of vertically spaced longitudinally extending bar members, each of said bar members being composed of a pair of longitudinally extending sections arranged to extend angularly with respect to the vertically disposed rails, and tie means rigidly connecting said bar members with said rails.

2. In a farm gate, a plurality of vertically extending longitudinally spaced rails, a plurality of horizontally disposed longitudinally extending bar members extending across said rails, each of said bar members being composed of a pair of longitudinally extending sections disposed in relatively angular relationship with respect to each other and on angular planes with respect to the vertical plane occupied by the said rails, and securing means for uniting said bar members with said rails.

3. In a farm gate, a plurality of longitudinally spaced substantially vertically disposed rails, a plurality of longitudinally extending vertically spaced bar members connected with said rails, each of said bar members being formed to include a pair of longitudinally extending wooden sections united in L shaped formation, the said sections occupying angular planes with respect to each other and with respect to the vertical plane of said rails, and fastening means arranged to surround said bar members and to directly connect the latter with said rails.

4. In a farm gate, a plurality of longitudinally substantially vertically disposed rails, a plurality of longitudinally extending vertically spaced bar members, each of said bar members consisting of a pair of wooden sections arranged in substantially L shaped formation, a groove and tongue joint between said sections, and substantially triangular shaped bolts connecting said bar members with said rails.

In testimony whereof I affix my signature.

CHARLEY BURNETT.